United States Patent [19]
Koziuk et al.

[11] Patent Number: 6,058,485
[45] Date of Patent: May 2, 2000

[54] METHOD AND APPARATUS FOR MANAGING POWER CONSUMPTION OF A DIGITIZING PANEL

[75] Inventors: Glen P. Koziuk; Mark S. Snyder, both of Colorado Springs, Colo.

[73] Assignee: LSI Logic Corporation, Milpitas, Calif.

[21] Appl. No.: 08/902,146

[22] Filed: Jul. 29, 1997

[51] Int. Cl.[7] ................................. G06F 1/32
[52] U.S. Cl. .................. 713/320; 713/323; 713/340; 345/173
[58] Field of Search ...................... 713/320, 323, 713/321, 340; 345/173

[56] References Cited

U.S. PATENT DOCUMENTS

| | | | |
|---|---|---|---|
| 4,370,733 | 1/1983 | Gaudio | 711/220 |
| 4,787,040 | 11/1988 | Ames et al. | 701/1 |
| 4,972,496 | 11/1990 | Sklarew | 382/187 |
| 5,329,625 | 7/1994 | Kannan et al. | 395/275 |
| 5,396,443 | 3/1995 | Mese et al. | 364/707 |
| 5,423,045 | 6/1995 | Kannan et al. | 395/750 |
| 5,524,249 | 6/1996 | Suboh | 395/750 |
| 5,548,765 | 8/1996 | Tsunoda et al. | 395/750 |
| 5,553,296 | 9/1996 | Forrest et al. | 395/750 |
| 5,568,409 | 10/1996 | Neoh | 364/702 |
| 5,777,604 | 7/1998 | Okajima et al. | 345/173 |
| 5,790,875 | 8/1998 | Andersin et al. | 713/321 |

*Primary Examiner*—Xuan M. Thai

[57] ABSTRACT

A method for managing power consumption of a digitizing panel includes the steps of: (a) applying a biasing voltage to the digitizing panel for a first period of time and ceasing to apply the biasing voltage to the digitizing panel for a second period of time; (b) determining whether a user has touched the digitizing panel during the first period of time; and (c) if the user has touched the digitizing panel during the first period of time, then applying a biasing voltage to the digitizing panel for a third period of time that is longer in duration than the first period of time and ceasing to apply the biasing voltage to the digitizing panel for a fourth period of time. An apparatus for implementing the method is also disclosed.

25 Claims, 5 Drawing Sheets

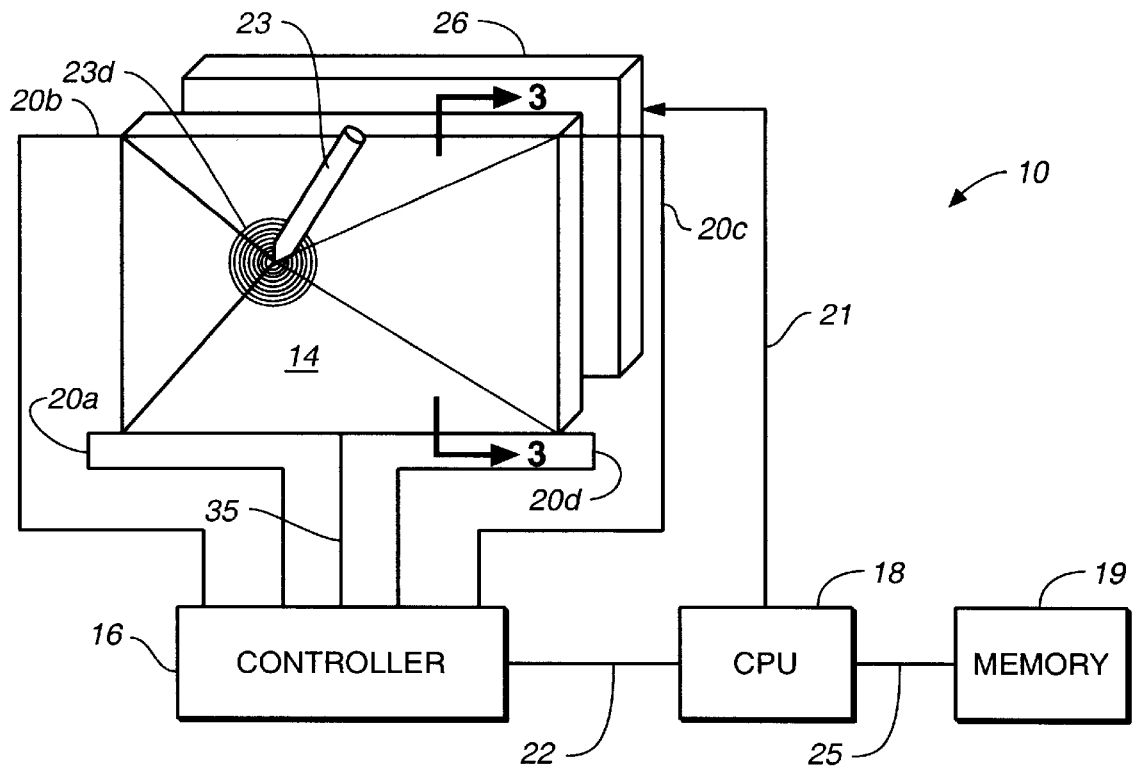
FIG._1
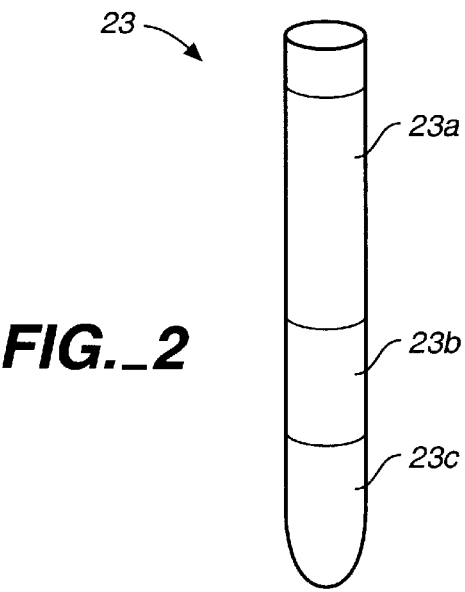
FIG._2

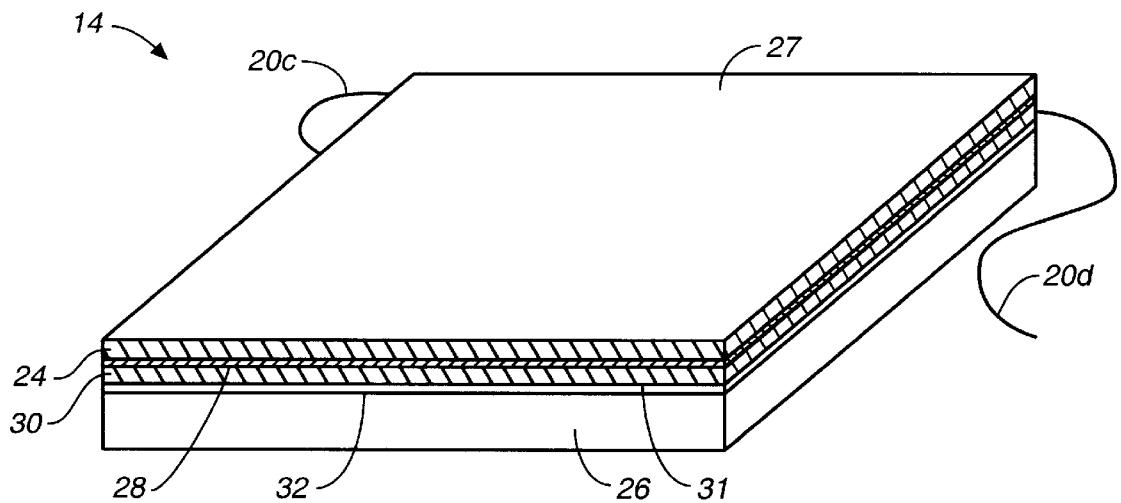
FIG._3
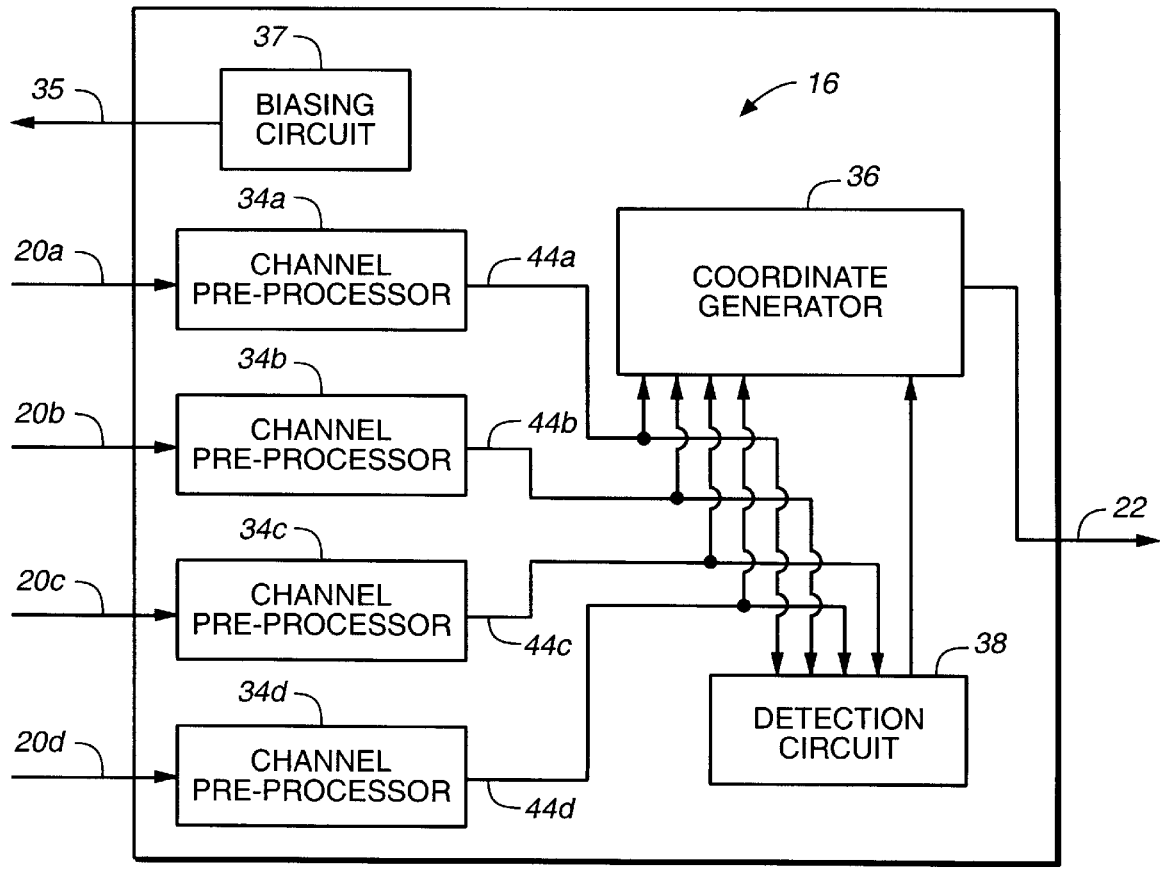
FIG._4

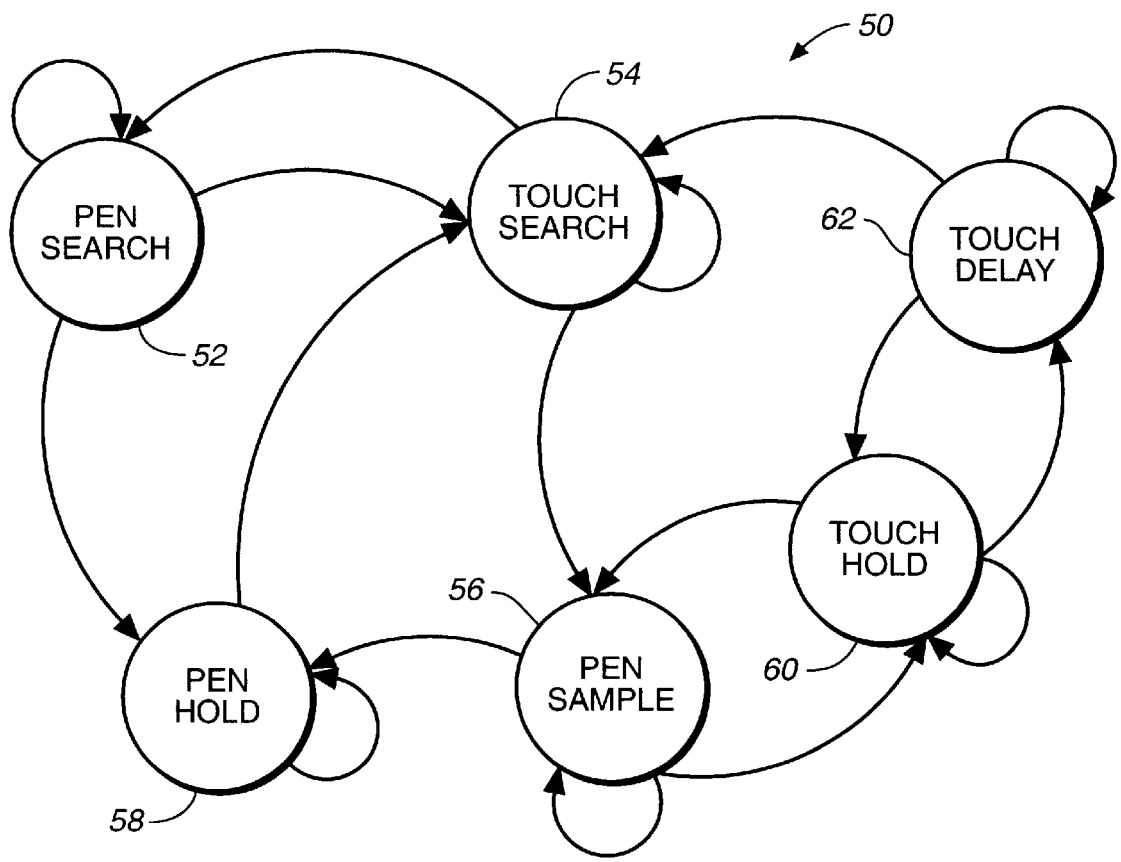
FIG._5

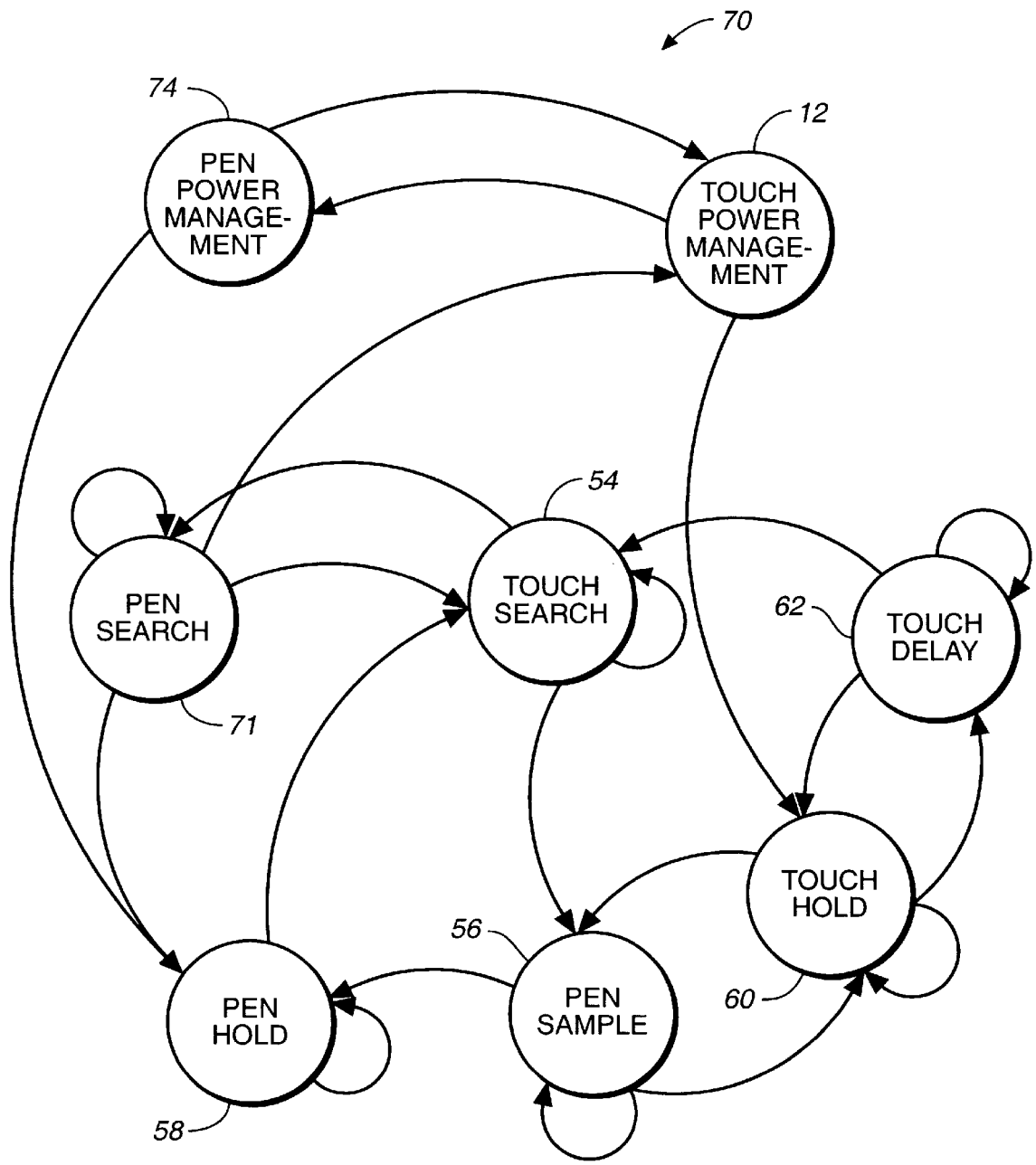
FIG._6

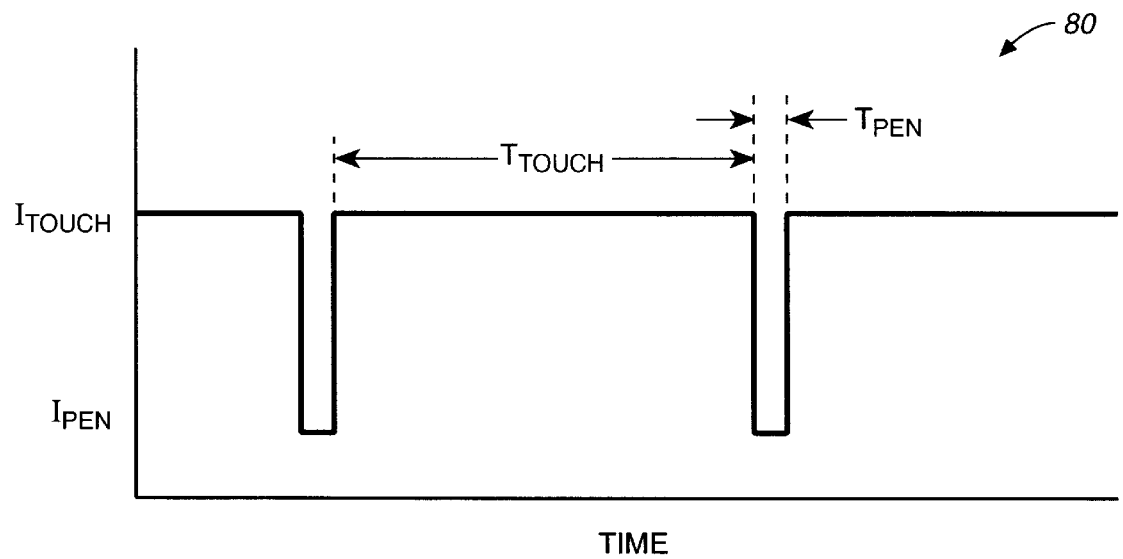
FIG._7
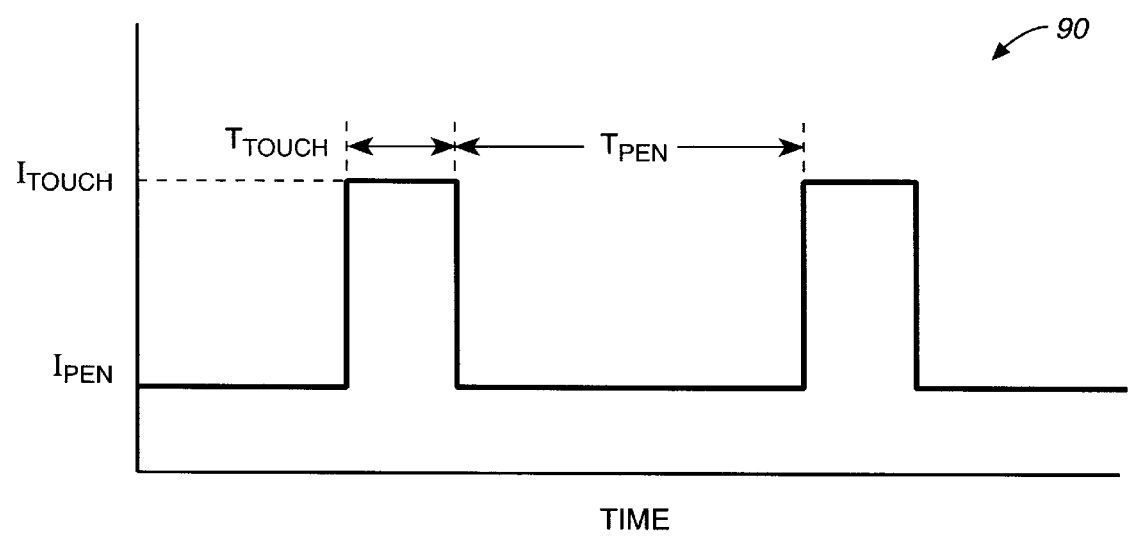
FIG._8

METHOD AND APPARATUS FOR MANAGING POWER CONSUMPTION OF A DIGITIZING PANEL

BACKGROUND OF THE INVENTION

The present invention relates generally to digitizing panels, and more particularly to a method and apparatus for managing power consumption of a digitizing panel.

Digitizing panels having a resistive layer covered with a non-conductive plate such as glass, are known in the art. The known digitizing panels may operate in one of two modes, namely a touch mode or a pen mode. When operating in the touch mode, a computer is conventionally configured so as to capacitively bias the resistive layer by applying to a shield layer of the digitizing panel an AC signal. An object such as a user's finger that approaches and contacts the non-conductive plate acts as a load that is capacitively coupled to the resistive layer. The capacitively coupled load causes electric current to flow through the corners of the resistive layer. The computer may determine a Cartesian coordinate (X, Y) position of an object relative to the digitizing panel, based on the current flow in each of the corners of the resistive layer in a manner known to one of ordinary skill in the art. More particularly, the position of the pen relative to the digitizing panel may be determined based upon a ratio of the corner currents or signals that flow through the corners of the resistive layer due to the object being capacitively coupled to the resistive layer.

When operating in the pen mode, the computer is conventionally configured so as to be receptive to a signal transmitted from a hand-held stylus or pen. In particular, a pen typically includes a battery portion which supplies power to an oscillator portion for stimulating a coil associated with a transmitter portion to transmit an AC signal from a tip of the pen. The AC signal may be transmitted from the pen tip when the tip contacts an object or surface such as the non-conductive plate associated with the digitizing panel.

The transmitted AC signal is typically capacitively coupled to the resistive layer associated with the digitizing panel. The capacitively coupled AC signal induces an electric current flow through each of the corners of the resistive layer. As in the touch mode, the position of the pen relative to the digitizing panel may then be determined based upon a ratio of the corner currents or signals that flow through the corners of the resistive layer due to the AC signal transmitted from the pen.

Therefore, these digitizing panels must bias the resistive layer with an AC signal in order to detect a touch but need not bias the resistive layer with an AC signal in order to detect a pen because the pen transmits an AC signal to the resistive layer. Furthermore, more hardware is required to detect a touch than to detect a pen due to the signal characteristics of the currents that flow through the corners of the resistive layer in response to pen contact and the signal characteristics of the currents that flow through the corners of the resistive layer in response to a touch. This biasing of the resistive layer and the powering of the additional hardware to detect a touch consumes power.

However, reducing power consumption in portable computers has gained a great deal of attention in the technical community as a result of a set of conflicting user requirements and technological constraints. On the one hand, users would like to operate these portable devices for extended periods of time without access to an AC wall outlet. This means that such devices must carry their own power sources, i.e., batteries of various types. On the other hand, the total energy stored in such batteries varies almost directly in proportion to their weight. Carrying heavy batteries of course, detracts from the portability of these machines.

These power consumption issues are of particular concern to digitizing panels since digitizing panels are a viable input alternative for the mouse and keyboard of portable computers. What is needed therefore is a method and an apparatus for managing power consumption of a digitizing panel.

SUMMARY OF THE INVENTION

In accordance with one embodiment of the present invention, there is provided a method for managing power consumption of a digitizing panel. The method includes the steps of: (a) applying a biasing voltage to the digitizing panel for a first period of time and ceasing to apply the biasing voltage to the digitizing panel for a second period of time; (b) determining whether a user has touched the digitizing panel during the first period of time; and (c) if the user has touched the digitizing panel during the first period of time, then applying a biasing voltage to the digitizing panel for a third period of time that is longer in duration than the first period of time and ceasing to apply the biasing voltage to the digitizing panel for a fourth period of time.

Pursuant to another embodiment of the present invention, there is provided a controller for a digitizing panel. The controller includes a number of current measurement circuits and a biasing circuit. The number of current measurement circuits are coupled to a number of points of the digitizing panel. The number of current measurement circuits generate a number of current values indicative of currents flowing through each of the number of points of the digitizing panel. The biasing circuit is coupled to the digitizing panel. The biasing circuit, until a user touches the digitizing panel, periodically apply a biasing voltage to the digitizing panel for a first period of time and cease to apply the biasing voltage to the digitizing panel for a second period of time. Then, the biasing circuit, until the user ceases to touch the digitizing panel, periodically apply the biasing voltage to the digitizing panel for a third period of time and cease to apply the biasing voltage to the digitizing panel for a fourth period of time, wherein the first period of time is shorter than the third period of time.

It is an object of the present invention to provide a new and useful method for managing power consumption of a digitizing panel.

It is another object of the present invention to provide a new and useful apparatus for managing power consumption of a digitizing panel.

It is yet another object of the present invention to provide an improved method and apparatus of power management for a digitizing panel having a touch mode.

It is yet a further object of the present invention to provide an improved method and apparatus that reduce power consumption of a digitizing panel operating in a pen-and-touch mode.

The above and other objects, features, and advantages of the present invention will become apparent from the following description and the attached drawings.

BRIEF DESCRIPTION OF THE DRAWINGS

FIG. 1 is a simplified block diagram of an exemplary computer which incorporates the features of the present invention therein;

FIG. 2 is a perspective view of the pen shown in FIG. 1;

FIG. 3 is a perspective view of a digitizing panel and associated display device taken along the line 3—3 in FIG. 1;

FIG. 4 is a block diagram of the controller shown in FIG. 1;

FIG. 5 is a state diagram depicting a method for controlling a digitizing panel which does not utilize certain power management features of the present invention;

FIG. 6 is a state diagram depicting a method for controlling a digitizing panel that utilizes power management features of the present invention;

FIG. 7 is a current versus time graph during the search states of FIG. 5 and FIG. 6; and FIG. 8 is a current versus time graph during the power management states of FIG. 6.

DETAILED DESCRIPTION OF THE PREFERRED EMBODIMENT

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a functional block diagram of a computer 10 such as a notebook or mobile computer which incorporates the features of the present invention therein. The computer 10 includes an electrostatic digitizing tablet or panel 14, controller 16, conventional central processing unit (CPU) 18, random access memory (RAM) 19, and display device 26 such as a liquid crystal display (LCD). The digitizing panel 14 is operatively coupled to the controller 16 through a number of corner wires 20a–20d and a biasing wire 35, and the CPU 18 is operatively coupled to the display device 26 through a display interface 21. Furthermore, the controller 16 is operatively coupled to the CPU 18 through a serial data line 22 such as a serial port, and the memory 19 is operatively coupled to the CPU 18 through a system bus 25.

A conventional hand-held stylus or pen 23 is used to input data into the computer 10 in a known manner, when the computer 10 is operating in a pen mode as described further below. Referring to FIG. 2, the pen 23 may be a cordless-type pen having a battery portion 23a, oscillator portion 23b and transmitter portion 23c. The battery portion 23a supplies power to the oscillator portion 23b which then stimulates a coil (not shown) associated with the transmitter portion 23c, to transmit an AC signal 23d (FIG. 1). In the embodiment being described, the signal 23d may have a carrier frequency of approximately 125 kHz.

The electrostatic digitizing panel 14 may include several layers of known material as shown in FIG. 3. In the embodiment being described, a glass layer 24 protects the display device 26 which is disposed below the glass layer 24. An upper surface 27 of the glass layer 24 defines a writing/touching surface for an object such as the pen 23 or a user's finger (not shown). A lower surface of the glass layer 24 has a resistive layer 28 of an active sensor material applied thereto. In the embodiment being described, the active sensor material may be a thin coating of transparent indium-tin-oxide (ITO) which is typically used in electrostatic digitizing panel applications.

Each corner wire 20a–20d is electrically connected to a respective corner of the resistive layer 28 for carrying current flow generated as a result of an object contacting the glass layer 24 as described further below. A polyester spall shield 30 is attached to the underside of the resistive layer 28 to prevent the glass surface 24 from shattering if ever broken. A lower surface of the spall shield 30 has an active ITO shield layer 31 applied thereto. The shield layer 31 forms an electrical shield reducing noise coupling from the LCD screen 26 to the resistive layer 28. Furthermore, the shield layer 31 provides the control with a mechanism for capacitively biasing the resistive layer 28 with a biasing voltage. An air gap 32 separates the lower surface of the spall shield 30 from an upper surface of the LCD screen 26.

The controller 16 may operate in one of two operational modes, namely a touch mode and a pen mode, or in one of two power management modes, namely a touch power management mode and a pen power management mode which are described later. In the touch mode of operation, the controller 16 capacitively biases the resistive layer 28 by applying to the shield layer 31 an AC signal. In particular, the controller 16 applies a 125 kHz biasing voltage to the resistive layer 28 via biasing wire 35 and the shield layer 31. As long as an object is not approaching the digitizing panel 14, the controller 16 is in a quiescent state and a finite amount of AC offset current may flow through the corner wires 20a–20d due to loading effects caused by stray or parasitic capacitance between the resistive layer 28 and any metal components of the computer 10 proximate the resistive layer 28.

When an object does approach the digitizing panel 14, the object increasingly acts as a capacitive load that is coupled to the resistive layer 28. An object that is capacitively coupled to the resistive layer 28 acts as a load on the resistive layer 28 which results in current flow through each of the corners of the resistive layer 28, and through the corner wires 20a–20d. The controller 16 may determine a Cartesian coordinate (X, Y) position of an object such as a user's finger relative to the digitizing panel 14, based on the current flow in each of the corner wires 20a–20d in a manner known to one of ordinary skill in the art.

In the pen mode of operation, the controller 16 grounds the shield layer 31. Furthermore, while in pen mode of operation, the controller 16 is receptive to the signal transmitted from the pen 23. In particular, a current flow is generated in each of the corner wires 20a–20d when the signal transmitted from the pen 23 is brought within close proximity to the digitizing panel 14. The controller 16 may determine a Cartesian coordinate (X, Y) position of the pen 23 relative to the digitizing panel 14, based on the current flow in each of the corner wires 20a–20d.

The magnitude of current flow through each of the corners of the resistive layer 28 (and in each of the corner wires 20a–20d) due to an object (pen or finger) which is capacitively coupled to the resistive layer 28, is proportional to the conductivity of the resistive layer 28 between each corner of the resistive layer 28 and the object at a particular position on the glass layer 24 as shown in FIG. 1. More particularly, the closer the object is to a particular corner of the resistive layer 28, the greater the conductivity of the resistive layer 28 and the greater the current flow through that corner. Likewise, the farther the object is from a particular corner of the resistive layer 28, the lower the conductivity of the resistive layer 28, and the lower the current flow through that corner. This current relationship to the corners of the resistive layer 28 is depicted in FIG. 1 by the relative thickness of lines extending between the object position and each of the corners of the resistive layer 28.

Referring now to FIG. 4, there is shown a simplified functional block diagram of the controller 16. In particular, the controller 16 includes a number of current measurement circuits or channel pre-processors 34a–34d, a coordinate generator 36, a biasing circuit 37, and a detection circuit 38.

Each channel pre-processors 34a–34d conventionally generates a current value that is indicative of the magnitude of current flowing through its respective corner wire 20a–20d. In the preferred embodiment, the channel pre-processors 34a–34d generate the current values by converting the current flowing through the respective corner wires 20a–20d into analog voltage signals that are indicative of the magnitude of current flowing through the respective corner wires 20a–20d. In addition, the channel pre-processors 34a–34d typically filter, rectify and convert the analog voltage signals into digital values in a known manner prior to placing the current values on lines 44a–44d. In the embodiment being described, the channel pre-processors 34a–34d convert the magnitude of the currents flowing through the corner wires 20a–20d into current values at a sampling rate of approximately 100 samples/second.

The biasing circuit 37 has at least two operational states, a normal state and a sleep state. During the normal state, the biasing circuit 37 conventionally supplies a biasing voltage to the shield layer 31 via biasing wire 35 for stimulating the resistive layer 28 so that a user's touch can be detected. In the preferred embodiment, the biasing circuit 37 conventionally supplies a 125 kHz biasing voltage to the shield layer 31. Furthermore, during the sleep state, the biasing circuit 37 ceases to supply the shield layer 31 with the biasing voltage. In the preferred embodiment, the biasing circuit 37 consumes less power when in the sleep state than when in the normal state. Furthermore, in the preferred embodiment, the biasing circuit 37 is designed to enter the normal state during touch and touch power management modes of operation and to enter the sleep state during pen and pen power management modes of operation.

The coordinate generator 36 receives the current values on lines 44a–44d and determines from the current values Cartesian (X, Y) coordinate pairs that depict the relation of the object relative to the digitizing panel 14. In particular, the position of an object relative to the digitizing panel 14 may be determined based upon a ratio of the sum of certain current values to the sum of the current values. This determination of coordinate pairs may be represented by equations (1a) and (1b):

$$X = \frac{C2 + C3}{C0 + C1 + C2 + C3} \quad (1a)$$

$$Y = \frac{C1 + C2}{C0 + C1 + C2 + C3} \quad (1b)$$

where C0, C1, C2, and C3 are the current values that channel pre-processors 34a–34d have placed upon lines 44a–44d respectively. The resulting coordinate pairs are sent from the coordinate generator 36 and received by the CPU 18 via line 22. The CPU 18 may use the reported coordinate pairs on line 22 for determining the position of the object to the digitizing panel and for performing a task such as causing digital ink to be displayed on display device 26.

The coordinate generator 36 furthermore has two operational states, a normal state and a sleep state. During the normal state, the coordinate generator 36 generates coordinate pairs from the current values. Furthermore, the coordinate generator 36, when in the normal state, may be caused to enter the sleep state. When the coordinate generator 36 is in the sleep state, the coordinate generator consumes less power than when in the normal state but does not generate coordinate pairs. While in the sleep state, the coordinate generator 36 is responsive to a wake-up signal which when received causes the coordinate generator 36 to enter the normal state.

The detection circuit 38 receives as inputs the current values from lines 44a–44d or alternatively the currents from the corner wires 20a–20d. The detection circuit 38 determines from these inputs whether a pen 23 is in close proximity to the digitizing panel 14. The detection circuit 38 makes this determination by summing the inputs and comparing the sum to a threshold value. If the sum is greater than the threshold value, the detection circuit 38 generates a wake-up signal. The threshold value is a value greater than the sum of the inputs resulting from a user touching the digitizing panel 14 during pen mode and less than the sum of the inputs resulting from a pen contacting the digitizing panel during pen mode. In this manner, the detection circuit 38 provides the controller 16 with a mechanism for determining when a pen is in close proximity to the digitizing panel 14.

In the preferred embodiment, the controller 16 operates the digitizing panel 14 in a pseudo pen-and-touch mode. At any one point in time, the controller 16 may be in pen mode, touch mode, pen power management mode, or touch power management mode. However, by quickly switching between the various modes, the digitizing panel 14 appears from a user's viewpoint to concurrently support input from either a pen 23 or a user's touch.

Referring now to FIG. 5, there is shown a state diagram 50 that depicts ne method for controlling the digitizing panel 14 when certain power management features of the present invention are not utilized. The state diagram 50 includes a pen search state 52, a touch search state 54, a pen sample state 56, a pen hold state 58, a touch hold state 60, and a touch delay state 62.

In the pen search state 52, if the controller 16 is not already in pen mode then the controller 16 is placed into the pen mode of operation. When the controller 16 enters the pen search state 52, a timer is set. If the timer expires before pen proximity is detect ed, then the controller 16 transitions to the touch search state 54. However, if pen proximity is detected before the timer expires, then the pen is determined to be the primary input device and the controller 16 transitions into the pen hold state 58.

In the touch search state 54, if the controller 16 is not already in touch mode, the controller 16 is placed into the touch mode of operation. When the controller 16 enters the touch search state 54, a timer is set. If the timer expires prior to a touch detection, then the controller 16 transitions into the pen search state. However, if a touch is detected, then the controller 16 transitions into the pen sample state 56.

In the pen sample state 56, if the controller 16 is not already in pen mode, the controller 16 is placed into the pen mode of operation. When the controller 16 enters the pen sample state 56, a timer is set. If the timer expires before a pen proximity detection, then the controller 16 transitions into the touch hold state 60. However, if a pen proximity is detected, then the controller 16 transitions into the pen hold state 58.

In the touch hold state 60, if the controller 16 is not already in the touch mode of operation, then the controller 16 is placed into the touch mode of operation. When the controller 16 enters the touch mode of operation, a timer is set. When the timer expires, the controller 16 transitions into the pen sample state 56. If a touch is no longer detected before the timer expires, then the controller 16 transitions into the touch delay state 62.

It should be appreciated that if a user is touching the digitizing panel, the controller 16 will continuously switch between the touch hold state 60 and the pen sample state 56. This continuous switching in essence causes the controller 16 to sample for pen proximity on a periodic basis even though a user is touching the digitizing panel 14. This sampling for pen proximity corrects for the situation in which the user is touching the digitizing panel 14 when using a pen 23. For example, the user may be resting their hand upon the digitizing panel 14 while writing with the pen 23.

In the pen hold state 58, the controller 16 remains in the pen mode of operation. As long as the pen remains in proximity with the digitizing panel 14, the controller 16 remains in the pen hold state 58. A timer is set whenever the pen leaves proximity of the digitizing panel 14. If the timer expires before pen proximity is re-established, then the controller 16 transitions into the touch search state 54.

In the touch delay state 62, the controller 16 remains in the touch mode of operation. Furthermore, upon entering the touch delay state 62, a timer is set. If the timer expires before a touch detection, then the controller 16 transitions into the touch search state 54. If, however, a touch is detected before the timer expires, then the controller transitions back to the touch hold state.

With reference now to FIG. 6, a state diagram 70 depicts one method for controlling the digitizing panel 14 when power management features of the present invention are utilized. The state diagram 70 has several states that are substantially the same as the states of state diagram 50 of FIG. 5 and as a result will not be discussed further. The state diagram 70 introduces two new states into the state diagram 50, the touch power management state 72 and the pen power management state 74. The state diagram 70 also replaces pen search state 52 with pen search state 71 which is a slightly altered version of pen search state 52.

The pen search state 71 is nearly identical to the pen search state 52 of FIG. 5. The pen search state 71, however, includes a second timer that is set when the controller 16 first enters the pen search state 71 and is not reset until the controller reenters the pen search state 71 after have entered the pen sample state 56. In essence this second timer tracks how long the controller 16 remains switching between the pen search state 71 and the touch search state 54. If this second timer expires while the controller 16 is in the pen search state 71, then the controller 16 transitions into the power management state 72.

Upon entering into the touch power management state 72, the controller 16 is placed into a touch power management mode and a timer is set. If the timer expires prior to a touch detection, then the controller 16 transitions into the pen power management state 74. However, if a touch is detected, then the controller 16 transitions into the touch hold state 60.

Upon entering into the pen power management state 74, the controller 16 is placed into a pen power management mode. The goal during the pen power management mode is to place all components of the controller 16 that are not required to detect pen proximity in a low power or sleep mode. For example, in the preferred embodiment, the detection circuit 38 is powered but the coordinate generator 36 and the biasing circuit 37 are in a low power or sleep mode. Furthermore, if the detection circuit 38 is coupled to the corner wires 20a–20d, then the channel pre-processors 34a–34d may also be placed in a low power or sleep mode.

Also upon entering into the pen power management state 74, the controller 16 sets a timer. If the timer expires prior to a pen proximity detection, then the controller 16 transitions into the touch power management state 72 and awakens the channel pre-processors 34a–34d, the coordinate generator 36, and the biasing circuit 37. However, if pen proximity is detected, then the controller 16 transitions into the pen hold state 58 and awakens the channel pre-processors 34a–34d and the coordinate generator 36.

It should be appreciated that the pen search state 71 and the pen management state 74 could be combined into one state that utilizes the pen power management mode. In essence, the controller 16 would enter pen power management mode whenever the controller 16 transitioned into pen search state 71.

The touch mode and the touch power management modes are nearly identical. The major difference is that the timer set in the touch power management state 72 is shorter in duration than the timer set in the touch hold state 60. This difference in timer duration and the effects this difference has on power consumption may be better understood with reference to FIG. 7 and FIG. 8. Furthermore, the timers of the touch power management state 72 and the touch hold state 60 in the preferred embodiment are programmable. In other words, the duration of the timers may be adjusted by a user, the computer 10, or other components of controller 16 even during operation. For example, the user may wish to tweak the performance of the system, or the controller 16 may contain fuzzy logic which may increase the time spent in the touch power management state 72 when the fuzzy logic "believes" a touch has occurred but is not quite "sure."

In FIG. 7 there is shown a current versus time graph 80 of when the controller 16 is switching between the pen search state 52 and the touch search state 54 (FIG. 5) or when the controller 16 is switching between the pen search state 71 and the touch search state 54 (FIG. 6). The $T_{touch}$ interval or period is the length of time the controller 16 remains in the touch search state 54 and is set by the timer of the touch search state 54. The $T_{pen}$ interval or period is the length of time the controller 16 remains in the pen search state 52 or the pen search state 71 and is set by a timer of the respective state. The $I_{touch}$ current is the current consumed during the touch search state 54. Likewise, the $I_{pen}$ current is the current consumed during the pen search states 54 or 71.

As can be seen from the graph 80, the controller 16 requires more current when in the touch search state 54 than when the pen search state 54 or 71. This difference in current requirements is primarily due to differences in how the controller 16 detects a touch versus how the controller 16 detects pen proximity. For example, the biasing circuit 37 must supply the shield layer 31 with the biasing voltage in order to detect a touch; however, no biasing voltage is needed to detect pen proximity.

Also as can be seen from the graph 80, the controller 16 spends more time in the touch search state 54 than when in the pen search state 54 or 71. The main reason for this difference in time is that pen proximity detection is quicker and easier for the controller 16 than touch detection. As a result, the controller 16 is given more time to search for a touch than to search for a pen.

In FIG. 8 there is shown a current versus time graph 90 of when the controller 16 is switching between the touch power management state 72 and the pen power management state 71. The $T_{touch}$ interval or period is the length of time the controller 16 remains in the touch power management state 72 and is set by the timer of the touch power management state 72. The $T_{pen}$ interval or period is the length of time the controller 16 remains in the pen power management state 74 and is set by the timer of the pen power management state 74. The $I_{touch}$ current is the current consumed during the touch power management state 72. Likewise, the $I_{pen}$ current is the current consumed during the pen power management state 74.

As can be seen from the graph 90, the controller 16 requires more current when in the touch power management state 72 than when the pen power management state 74. This difference in current requirements is primarily due to differences in how the controller 16 detects a touch versus how the controller 16 detects pen proximity. For example, the biasing circuit 37 must supply the shield layer 31 with the biasing voltage in order to detect a touch; however, no biasing voltage is needed to detect pen proximity.

Comparing the graph of 80 to the graph of 90, it should be apparent that the controller 16 consumes less current, therefore less power, when the controller 16 is switching between the power management states 72 and 74 than when switching between the search states 54 and 71.

In operation the controller 16 enters the search states 54 and 71 after the user ceases to touch the digitizing panel 14 for a period of time or after a pen is no longer proximate the digitizing panel 14 for a period of time. The controller 16 stays in the search states 54 and 71 for a period of time after these events. While in the search states 54 and 71, the controller 16 is consuming more power but is more responsive to touch and pen proximity than when in the power management states 72 and 74. After a certain period of time in the search states 54 and 71 without a touch or pen proximity detection, the controller 16 enters the power management states 72 and 74. While in the power management states, the controller 16 is somewhat less responsive to touch and pen proximity but consumes less power than when the search states 54 and 71. The controller 16 then stays in the power management states 72 and 74 until a touch or pen proximity is detected, at which time the controller enters the hold states 58 or 60 in which the controller 16 generates coordinate points indicative of the relative position of the touch or pen proximity to the digitizing panel 14.

As a result, this operation which in essence places the controller 16 in a low power mode of operation when the digitizing panel 14 is not in use by a user, extends the battery life or reduces the power consumption over time of a device which incorporates the digitizing panel 14.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method for managing power consumption of a digitizing panel, comprising the steps of:
   applying a biasing voltage to the digitizing panel for a first period of time and ceasing to apply the biasing voltage to the digitizing panel for a second period of time;
   determining whether a user has touched the digitizing panel during the first period of time; and
   if the user has touched the digitizing panel during the first period of time, then applying a biasing voltage to the digitizing panel for a third period of time that is longer in duration than the first period of time and ceasing to apply the biasing voltage to the digitizing panel for a fourth period of time.

2. The method of claim 1, further comprising the steps of:
   if the user touches the digitizing panel during the first period of time, then generating coordinates indicative of the relative position of the touch to the digitizing panel.

3. The method of claim 1, further comprising the step of:
   if the user touches the digitizing panel during the third period of time, then generating coordinates indicative of the relative position of the touch to the digitizing panel.

4. The method of claim 1, wherein the step of applying the biasing voltage to the digitizing panel for the first period of time and ceasing to apply the biasing voltage to the digitizing panel for the second period of time is periodically executed until the user touches the digitizing panel during the first period of time.

5. The method of claim 1, wherein the step of applying the biasing voltage to the digitizing panel for the third period of time and ceasing to apply the biasing voltage to the digitizing panel for the fourth period of time is periodically executed until the user ceases to touch the digitizing panel during the third period of time.

6. The method of claim 1, wherein the step of applying the biasing voltage to the digitizing panel for the third period of time and ceasing to apply the biasing voltage to the digitizing panel for the fourth period of time is periodically executed until the user ceases to touch the digitizing panel for a fifth period of time.

7. The method of claim 1, further comprising the steps of:
   supplying a coordinate generator with a first amount of power during the first period of time; and
   supplying the coordinate generator with a second amount of power that is less than said first amount of power during the second period of time.

8. The method of claim 1, further comprising the steps of:
   determining whether a signal from a pen is present on the digitizing panel during the fourth period of time; and
   if the signal is present during the fourth period of time, then generating coordinates indicative of the relative position of the pen to the digitizing panel.

9. The method of claim 1, further comprising the steps of:
   determining whether a signal from a pen is present on the digitizing panel during the second period of time; and
   if the signal is present during the second period of time, then generating coordinates indicative of the relative position of the pen to the digitizing panel.

10. The method of claim 9, further including the step of:
    once the signal is present during the second period of time, periodically generating coordinate values indicative of the relative position of the pen to the digitizing panel until the signal ceases to be present.

11. The method of claim 9, further including the step of:
    once the signal is present during the second period of time, periodically generating coordinate values indicative of the relative position of the pen to the digitizing panel until the signal ceases to be present for a fifth period of time.

12. A controller for a digitizing panel, comprising:
    a plurality of current measurement circuits coupled to a plurality of points of the digitizing panel, said plurality of current measurement circuits generating a plurality of current values indicative of the magnitude of a current flowing through each of said plurality of points; and
    a biasing circuit coupled to the digitizing panel, said biasing circuit, until a user touches the digitizing panel, periodically applying a biasing voltage to the digitizing panel for a first period of time and ceasing to apply said biasing voltage to the digitizing panel for a second period of time, then said biasing circuit, until said user ceases to touch the digitizing panel, periodically applying said biasing voltage to the digitizing panel for a third period of time and ceasing to apply said biasing voltage to the digitizing panel for a fourth period of time, wherein said first period of time is shorter in duration than said third period of time.

13. The controller of claim 12, wherein said biasing circuit consumes more power when said biasing circuit applies said biasing voltage to the digitizing panel than when said biasing circuit ceases to apply said biasing voltage to the digitizing panel.

14. The controller of claim 12, further including:

a coordinate generator coupled to said plurality of current measurement circuits, said coordinate generator generating at least one coordinate value from said plurality of current values.

15. The controller of claim 12, wherein said first period of time is programmable.

16. The controller of claim 12, wherein said third period of time is programmable.

17. The controller of claim 12, wherein said biasing circuit causes a plurality of touch currents to flow through said plurality of points when said biasing voltage is applied to the digitizing panel and the user touches the digitizing panel.

18. The controller of claim 12, further including:

a detection circuit coupled to said plurality of current measurement circuits, said detection circuit generating a wake-up signal when the sum of said current values is greater than a threshold value.

19. The controller of claim 18, wherein said threshold level is less than the sum of a plurality of signal currents that flow through said plurality of points due to a pen signal being capacitively coupled to the digitizing panel.

20. The controller of claim 19, wherein said coordinate generator consumes more power in a first operational state than said coordinate generator consumes in a second operational state; and wherein said coordinate generator enters said first operational state during said second period of time; and wherein said coordinate generator enters said second operational state in response to said wake-up signal.

21. A method for managing power consumption of a digitizing panel, comprising the steps of:

applying a biasing voltage to the digitizing panel for a touch power management period of time and ceasing to apply the biasing voltage to the digitizing panel for a pen power management period of time;

determining whether a user has touched the digitizing panel during the touch power management period of time; and if the user has touched the digitizing panel during the touch power measurement period of time, then applying a biasing voltage to the digitizing panel for a touch search period of time that is longer in duration than the touch power management period of time and ceasing to apply the biasing voltage to the digitizing panel for a pen search period of time that is shorter in duration than the pen power management period of time.

22. The method of claim 21, wherein the step of applying the biasing voltage to the digitizing panel for the touch power management period of time and ceasing to apply the biasing voltage to the digitizing panel for the pen power management period of time is periodically executed until the user touches the digitizing panel during the touch power management period of time.

23. The method of claim 22, wherein the step of applying the biasing voltage to the digitizing panel for the touch search period of time and ceasing to apply the biasing voltage to the digitizing panel for the pen search period of time is periodically executed until the user ceases to touch the digitizing panel for a search period of time.

24. The method of claim 21, further comprising the steps of:

supplying a coordinate generator during the touch power measurement period of time with a first amount of power that is sufficient for the coordinate generator to produce coordinates indicative of the relative position of the touch to the digitizing panel; and supplying the coordinate generator during the pen power measurement period of time with a second amount of power that is (i) less than the first amount of power, and (ii) sufficient to enable the coordinate generator to be responsive to a wake-up signal.

25. The method of claim 21, further comprising the step of:

determining whether a signal from a pen is present on the digitizing panel during the pen power management period of time, wherein the step of applying the biasing voltage to the digitizing panel for the touch search period of time and ceasing to apply the biasing voltage to the digitizing panel for the pen search period of time is also executed in response to determining that the user has touched the digitizing panel during the pen power measurement period of time.

* * * * *